(12) United States Patent
Dudar

(10) Patent No.: US 10,315,663 B2
(45) Date of Patent: Jun. 11, 2019

(54) ADAPTIVE CLIMATE CONTROL SYSTEM

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 15/402,911

(22) Filed: Jan. 10, 2017

(65) Prior Publication Data

US 2018/0194361 A1    Jul. 12, 2018

(51) Int. Cl.
*B60W 10/30* (2006.01)
*B60W 50/00* (2006.01)
*B60H 1/00* (2006.01)

(52) U.S. Cl.
CPC ..... *B60W 50/0098* (2013.01); *B60H 1/00764* (2013.01); *B60W 10/30* (2013.01); *B60W 2520/10* (2013.01); *B60W 2530/00* (2013.01); *B60W 2560/00* (2013.01); *B60W 2710/30* (2013.01)

(58) Field of Classification Search
CPC .................................................... B60W 10/30
See application file for complete search history.

(56) References Cited

U.S. PATENT DOCUMENTS

| | | |
|---|---|---|
| 6,345,767 B1 | 2/2002 | Burrus, IV et al. |
| 6,693,535 B2 | 2/2004 | Van Bosch et al. |
| 8,831,840 B2 | 9/2014 | Klappert et al. |
| 9,213,338 B1 | 12/2015 | Ferguson |
| 9,409,549 B2 | 8/2016 | Yopp et al. |
| 2004/0262940 A1 | 12/2004 | Johnson |
| 2009/0031741 A1* | 2/2009 | Hara ................... B60H 1/00735 62/239 |
| 2012/0198865 A1* | 8/2012 | Lockwood ........... B60H 1/3213 62/89 |
| 2014/0277874 A1* | 9/2014 | Crombez ............. B60W 10/06 701/22 |
| 2015/0130603 A1* | 5/2015 | Lee ..................... B60R 16/0236 340/439 |
| 2015/0226146 A1 | 8/2015 | Elwart et al. |
| 2017/0131611 A1* | 5/2017 | Brown .................... G02F 1/163 |

OTHER PUBLICATIONS

Search Report dated Jun. 25, 2018 for Great Britain Patent Application No. GB 1800140.4 (4 Pages).

* cited by examiner

*Primary Examiner* — Kimberly S Berona
*Assistant Examiner* — Anshul Sood
(74) *Attorney, Agent, or Firm* — Frank Lollo; Neal, Gerber & Eisenberg LLP; James P. Muraff

(57) ABSTRACT

Method and apparatus are disclosed for an adaptive climate control system. An example vehicle includes a plurality of sensors to determine the speed of the vehicle, an internal temperature of the vehicle, and a fuel economy of the vehicle. The vehicle includes control units each coupled to a corresponding window and an HVAC controller. The vehicle also includes a processor and memory with a climate control adapter. The climate control adapter performs adaptive cooling based on the speed, fuel economy, and the internal temperature of the vehicle.

18 Claims, 5 Drawing Sheets

ADAPTIVE CLIMATE CONTROL SYSTEM

TECHNICAL FIELD

The present disclosure generally relates to vehicles with systems to cool the vehicle's cabin and, more specifically, an adaptive climate control system.

BACKGROUND

HVAC systems are nearly ubiquitous in modern vehicles such as cars, trucks, and SUVs. Specifically, vehicles use an air conditioner connected to a series of vents in order to blow cool air into the vehicle cabin. With an air conditioner, cooling is generally achieved by circulating refrigerant through a compressor, a condenser, an expansion valve, an evaporator. First, the compressor increases the pressure, and thus the temperature, of the refrigerant and routes it through the condenser as a liquid. Air is blown over the warm compressor to carry heat away from the system, and the liquid refrigerant passes through the expansion valve. As the refrigerant passes through the expansion valve, it suddenly loses pressure causing it to evaporate, thus lowering its temperature. As the cold refrigerant is routed through the evaporator, a fan blows warm air from the area to be cooled, in this case a vehicle's cabin, over the evaporator and the now cooled air is routed back into the area to be cooled. The process repeats as the refrigerant is routed back into the compressor.

Cooling may also be achieved, however, by opening the vehicle's windows. When using open windows to cool a vehicle's cabin, no refrigeration is involved. Instead, cooling is achieved by the airflow caused by the movement of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

A vehicle includes a plurality of sensors to determine the speed of the vehicle, an internal temperature of the vehicle, and a fuel economy of the vehicle. The vehicle includes control units each coupled to a corresponding window and an HVAC controller. The vehicle also includes a processor and memory with a climate control adapter. The climate control adapter performs adaptive cooling based on the speed, fuel economy, and the internal temperature of the vehicle.

An example disclosed method includes opening a window of a vehicle. The example method also includes calculating a change in fuel economy of the vehicle. Additionally, the method includes closing the window and activating an air conditioner of the vehicle, via an HVAC controller, in response to the change in fuel economy satisfying a fuel economy threshold.

An example method includes measuring a speed of a vehicle. The example method also includes receiving speed data based on a model of the vehicle. The speed data correlated different speeds of the vehicle with first states of vehicle windows and second states of a vehicle air conditioner. Additionally, the example method includes performing one of opening the vehicle windows or activating the vehicle air conditioner based on the speed data.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
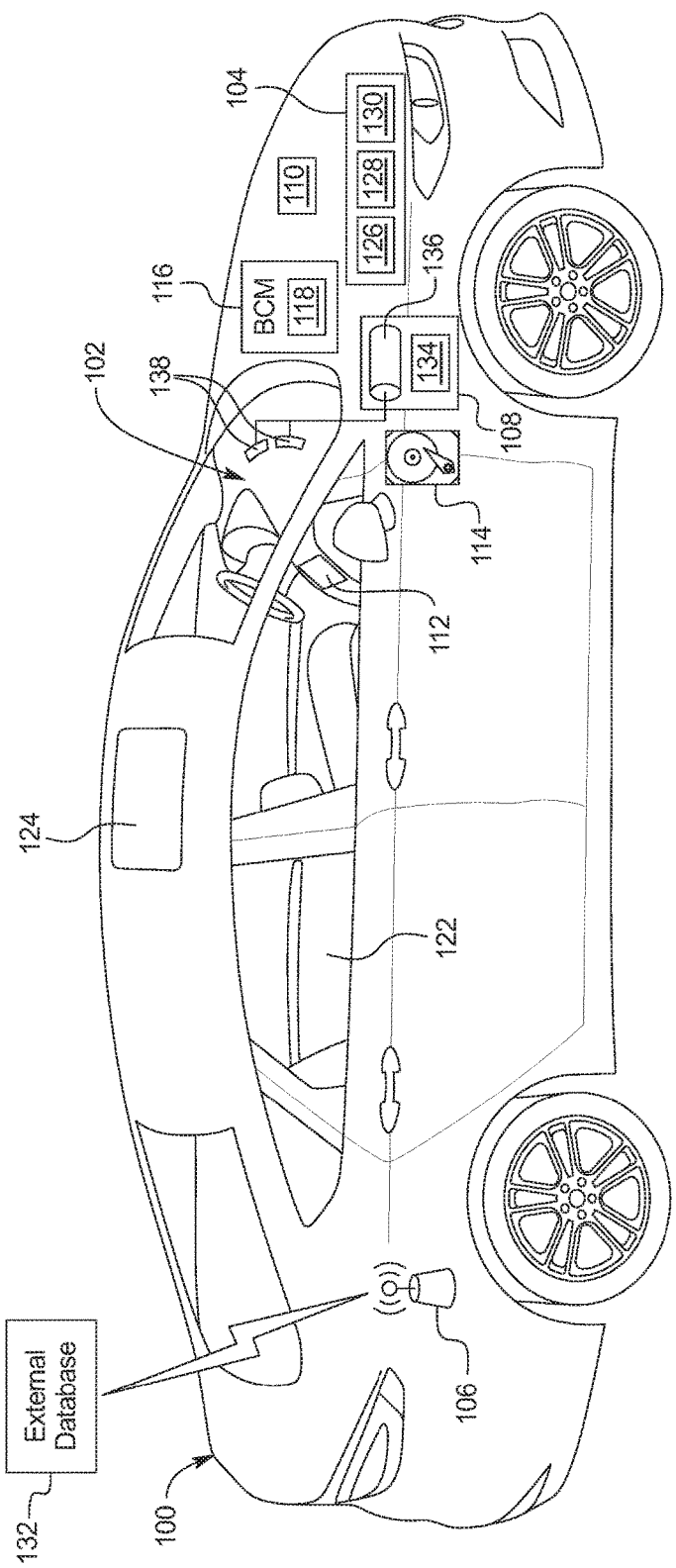
FIG. 1 is an illustration of a vehicle that includes an example adaptive climate control system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A vehicle, such as a car, is cooled in order to keep the occupants comfortable. In general, cooling is accomplished with air conditioning or with airflow by opening the vehicle's windows while in motion. There are tradeoffs to using either method. Running air conditioning uses energy and reduces the vehicle's fuel economy. Similarly, open windows increase the vehicle's drag, as a function of the vehicle's speed, and reduce the vehicle's fuel economy. Because, at high speeds, the drag caused by open windows impacts fuel economy more than running air conditioning, air conditioning should be used. In addition, too much airflow may cause discomfort for the vehicle's occupants. Because, at low speeds, the drag caused by open windows impacts fuel economy less than running air conditioning, open windows should be used. However, at intermediate speeds it is not apparent which cooling method should be used. Because of this, the vehicle's operator may needlessly harm fuel economy by unknowingly choosing the wrong cooling method at a given speed.

An example system as disclosed in more detail below provides an adaptive climate control system. The system uses sensors to measure fuel economy, speed, and cabin temperature. The system uses this information to switch between open windows and air conditioning in order to cool the cabin with the method that causes the lesser impact on fuel economy. More specifically, the system chooses a particular cooling method depending on the vehicle's speed relative to two threshold speeds.

Below the first (e.g., lower) threshold speed, the system opens the vehicle's windows to cool the cabin. The first threshold speed may be, for example, 20 MPH. Below the first threshold speed the fuel economy decrease caused by the increased drag from the open windows is less than the fuel economy decrease that would be caused by running the air conditioning. Above the second (e.g., higher) threshold speed, the system runs the air conditioning to cool the cabin. For example, the second threshold speed may be 50 MPH. Above the second threshold speed the fuel economy decrease caused by the air conditioning is less than the fuel economy decrease that would be caused by increased drag from open windows.

Between the first and second threshold speeds, the system adaptively determines which cooling method to use. To determine which cooling method to use, the system: (a) opens the windows, measures the fuel economy, and determines whether it would be more fuel efficient to use the air conditioning; or (b) receives or otherwise retrieves data regarding the action to take at the vehicle's current speed. For example, another vehicle of the same model may have already generated efficiency data regarding whether to use windows or air conditioning at the vehicle's current speed. If efficiency data is available, the system activates the cooling method specified by the efficiency data. The efficiency data may be stored on and retrieved from, for example, a database maintained by a vehicle manufacturer. Such a database may be accessible, for example, via the Internet. In some examples, the system retrieves efficiency data that it previously generated itself from local data storage.

If efficiency data is not available from an external database or the local data storage, the system first opens the windows. After opening the windows, the system computes the decrease in fuel economy caused by the increased drag. If the decrease in fuel economy is greater than a threshold, the system closes the windows and activates the air conditioning. Otherwise the system leaves the windows open. In some examples, the threshold is the decrease in fuel economy that would be caused by using the air conditioning. In some examples, to better control cabin temperature and fuel economy (e.g. to achieve a smaller temperature drop but better fuel economy), the system opens only some windows or opens windows only partially.

FIG. 1 is an illustration of a vehicle 100 that includes an example adaptive climate control system. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes: a cabin 102; sensors 104; an on-board communications platform 106; an HVAC system 108; an efficiency monitor 110; an infotainment head unit 112; an internal data storage device 114; a body control module 116; and a climate control adapter 118.

The cabin 102 is the interior of the vehicle 100 including, for example the driver's seat, the passenger's seat, the back seats, etc. The cabin 102 is partially defined by power windows 120-126. In the illustrated example, the power windows include front windows 120, rear windows 122, and a sun roof 124. In some examples, such as where the vehicle 100 is a pickup truck, the power windows 120 include a back window (not shown). The cabin 102 holds occupants (e.g. a driver and passengers) when the vehicle 100 is in operation.

The vehicle 100 may cool the cabin 102 to provide a comfortable cabin 102 temperature for occupants. In some examples, when the vehicle 100 is an autonomous vehicle, the cabin 102 may at times contain no occupants. In some such examples, when the cabin 102 contains no occupants, the vehicle 100 maintains a comfortable cabin temperature for the benefit of future occupants. For example, a comfortable cabin 102 temperature may be between 65 and 70 degrees Fahrenheit.

The vehicle 100 includes an infotainment head unit 112 within the cabin 102. The infotainment head unit 112 provides an interface between the vehicle 100 and the occupant(s) of the vehicle 100. The infotainment head unit 112 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 112 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 112 displays the infotainment system on, for example, the center console display. In some examples, the infotainment head unit 112 is used to adjust settings, such as the first and second temperature thresholds, of the adaptive climate control system.

The sensors 104 may be arranged in and around the vehicle 100 in any suitable fashion. The sensors 104 may be mounted to measure properties around the exterior of the vehicle 100. Additionally, some sensors 104 may be mounted inside the cabin of the vehicle 100 or in the body of the vehicle 100 (such as the engine compartment, the wheel wells, etc.) to measure properties in the interior of the vehicle 100. For example, such sensors 104 may include accelerometers, odometers, tachometers, pitch and yaw sensors, wheel speed sensors, microphones, tire pressure sensors, and biometric sensors, etc. In the illustrated example, the sensors 104 include temperature sensors 126, a speed sensor 128, and/or an air quality sensor 130. The temperature sensors 126 measure the temperature of the cabin 102 and the ambient temperature to determine when to cool the cabin 102. The speed sensor 128 measures the speed of the vehicle 100. For example, the speed of the vehicle 100 may be measured via the rotation of the wheels or drive shaft. The air quality sensor 130 measures ambient air quality to determine whether to override normal operation of the adaptive climate control system based on air pollution.

The on-board communications platform 106 includes wired or wireless network interfaces to enable communication with external networks. The on-board communications platform 106 also includes hardware (e.g., processors, memory, storage, antenna, etc.) and software to control the wired or wireless network interfaces. In the illustrated example, the on-board communications platform 106 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11a/b/g/n/ac or others), dedicated short range communication (DSRC), and Wireless Gigabit (IEEE 802.11ad), etc.). In some examples, the on-board communications platform 106 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the vehicle 100 may communicate with the external network via the coupled mobile device. The external network(s) may be a public network, such as the Internet; a private network, such as an intranet; or combinations thereof, and may use a variety of networking protocols now available or later developed including, but not limited to, TCP/IP-based networking protocols. In the illustrated example, the on-board communications platform 106 is in communication with an external database 132. In some examples, the external database 132 is a database maintained by a vehicle manufacturer and contains data generated by a vehicle of the same make and model.

The HVAC system 108 includes an HVAC controller 134, an air conditioner 136, and vents 138. The vents 138 connect the cabin 102 to the air conditioner 136. When the HVAC controller 134 activates the air conditioner 136, the air conditioner 136 blows cold air into the cabin 102.

The efficiency monitor 110 measures the fuel economy of the vehicle 100. For standard vehicles, the fuel economy is measured in distance per amount of fuel (e.g., miles per gallon, kilometers per liter, etc.). For electric vehicles, the fuel economy is measured in high voltage power draw (e.g., miles per kilowatt hours, etc.). For hybrid vehicles, the fuel economy is measure as a combination of distance per amount of fuel and high voltage power draw. For example, when the combustion engine is being used, the fuel economy may be measured in distance per amount of fuel, and when the electric motor is engaged, the fuel economy may be measured in high voltage power draw. In some examples, the efficiency monitor uses data from fuel level sensors, electrical sensors, and other sources to calculate the vehicle's 100 fuel economy. In the illustrated example, measurements from the efficiency monitor 110 are stored to the internal data storage device 114.

The body control module 116 controls various subsystems of the vehicle 100. For example, the body control module 116 controls the power windows 120-124, power locks, an immobilizer system, and/or power mirrors, etc. The body control module 116 includes circuits to, for example, drive relays (e.g., to control wiper fluid, etc.), drive brushed direct current (DC) motors (e.g., to control power seats, power locks, wipers, etc.), drive stepper motors, and/or drive LEDs, etc. In the illustrated example, the body control module 116 includes a climate control adapter 118. The climate control adapter 118 is in communication with the sensors 104, the on-board communications platform 106, the HVAC controller 134, the infotainment head unit 112, and the power windows 120-124.

The climate control adapter 118 monitors the cabin 102 temperature via temperature sensors 126. When the cabin 102 temperature satisfies (e.g. rises above) a first temperature threshold, the climate control adapter 118 activates adaptive cooling. For example, the first temperature threshold may be 70 degrees Fahrenheit. With adaptive cooling active, the climate control adapter 118 selects between opening the power windows 120-124 and using the air conditioner 136 in order to cool the vehicle's 100 cabin 102.

In the illustrated example, the selection is made based on the vehicle's 100 speed. In some examples, if the cabin 102 temperature fails to satisfy (e.g. falls below) a second temperature threshold, the climate control adapter 118 deactivates adaptive cooling. For example, the second temperature threshold may be 65 degrees Fahrenheit.

When adaptive cooling is active, the climate control adapter 118 operates in one of three modes: low speed, high speed, and intermediate speed. When adaptive cooling is active and the climate control adapter 118 detects, via the speed sensor 128, that the vehicle's 100 speed does not satisfy (e.g. is less than) a first threshold, the climate control adapter 118 enters the low speed mode. For example, the first threshold may be 20 MPH. In the low speed mode, the climate control adapter 118 opens the power windows 120-124 to cool the cabin 102. Below the first threshold, the increased drag caused by open windows 120-124 impacts the vehicle's 100 fuel economy less than running the air conditioner 136. In some examples, the climate control adapter 118 may activate the air conditioner 136 instead, despite being in the low speed mode. In some such examples, the climate control adapter 118 activates the air conditioner 136 despite being in low speed mode because of poor ambient air quality (e.g. an Air Quality Index greater than 100, as defined by the United States Environmental Protection Agency), as measured by the air quality sensor 130, or a high ambient temperature, as measured by the temperature sensors 126. For example, if the ambient temperature is greater than 95 degrees Fahrenheit, the climate control adapter 118 may activate the air conditioner 136 instead of opening the power windows 120-124.

When the adaptive cooling is active and the climate control adapter 118 detects, via the speed sensor 128, that the vehicle's 100 speed satisfies (e.g. is greater than) a second threshold, the climate control adapter 118 enters the high speed mode. For example, the second threshold may be 50 MPH. In the high speed mode, the climate control adapter 118 activates the air conditioner 136 to cool the cabin 102. Above the second threshold, the increased drag caused by open windows 120-124 impacts the vehicle's 100 fuel economy more than running the air conditioner 136.

When the adaptive cooling is active and the climate control adapter 118 detects, via the speed sensor 128, that the vehicle's 100 speed satisfies (e.g. is greater than) the first threshold but does not satisfy the second threshold, the climate control adapter 118 enters the intermediate speed mode. In the intermediate speed mode the climate control adapter 118 determines whether to cool the cabin 102 (a) by opening the power windows 120-124 or (b) by using the air conditioner 136. In the illustrated example, the climate control adapter 118 requests efficiency data which indicates whether to open the power windows 120-124 or use the air conditioner 136 at the vehicle's 100 current speed. In some examples, the data is retrieved from the internal data storage device 114. As discussed below, in some examples, the internal data storage device 114 includes efficiency data generated by the climate control adapter 118 and/or obtained from the external database 132. In some examples, the efficiency data is retrieved, via the on-board communications platform 106, from the external database 132. If no appropriate data (e.g. data from a vehicle of the same make and model of the vehicle 100 for the same speed) is available or the climate control adapter 118 otherwise does not retrieve the data, the climate control adapter 118 opens the power windows 120-124. After opening the power windows 120-124, the climate control adapter 118 computes a fuel economy delta using information from the efficiency monitor 110. In the illustrated example, the fuel economy delta is the difference between a second fuel economy the vehicle's 100 current fuel economy. In the illustrated example, the second fuel economy is the hypothetical fuel economy of the vehicle 100 using no cooling at the vehicle's 100 current speed, as calculated by the efficiency monitor 110. If the fuel economy delta satisfies (e.g. is greater than) a fuel economy threshold, then the climate control adapter 118 closes the windows and activates the air conditioner 136. If the fuel economy delta does not satisfy (e.g. is less than) the fuel economy threshold, then the climate control adapter 118 leaves the power windows 120-124 open. In some examples, the fuel economy threshold is the change in fuel economy caused by running the air conditioner 136, as calculated by the efficiency monitor 110.

In the illustrated example, when the climate control adapter 118 leaves the power windows 120-124 open because the fuel economy delta is less than the fuel economy threshold, after waiting for a time period the climate control adapter 118 determines whether the cabin 102 temperature is less than the first temperature threshold. For example, the time period may be one minute, and may be identical each time the climate control adapter 118 waits. If the cabin 102 temperature is not less than the first temperature threshold, then the climate control adapter 118 closes the power windows 120-124 and activates the air conditioner 136. If the cabin 102 temperature is greater than the first temperature threshold, then the climate control adapter 118 determines whether the cabin 102 temperature is less than the second temperature threshold. If the cabin 102 temperature is less than the second temperature threshold, then the climate control adapter 118 adjusts the positions of the power windows 120-124 to raise the cabin 102 temperature. Example adjustments include: (a) closing the rear windows 122 and leaving the front windows 120 open; (b) closing the front windows 120 but leaving the sun roof 124 and rear windows 122 open; and (c) opening the front windows 120 and back window.

In the illustrated example, the climate control adapter 118 stores efficiency data to the internal data storage device 114 while in the intermediate speed mode. Example data includes the speed of the vehicle 100 and the actions taken by the climate control adapter 118. In some examples, the climate control adapter uploads the efficiency data to the external database 132 while in the intermediate speed mode. Example efficiency data includes the make and model of the vehicle 100, the speed of the vehicle 100, and the actions taken by the climate control adapter 118.

Figure 2:
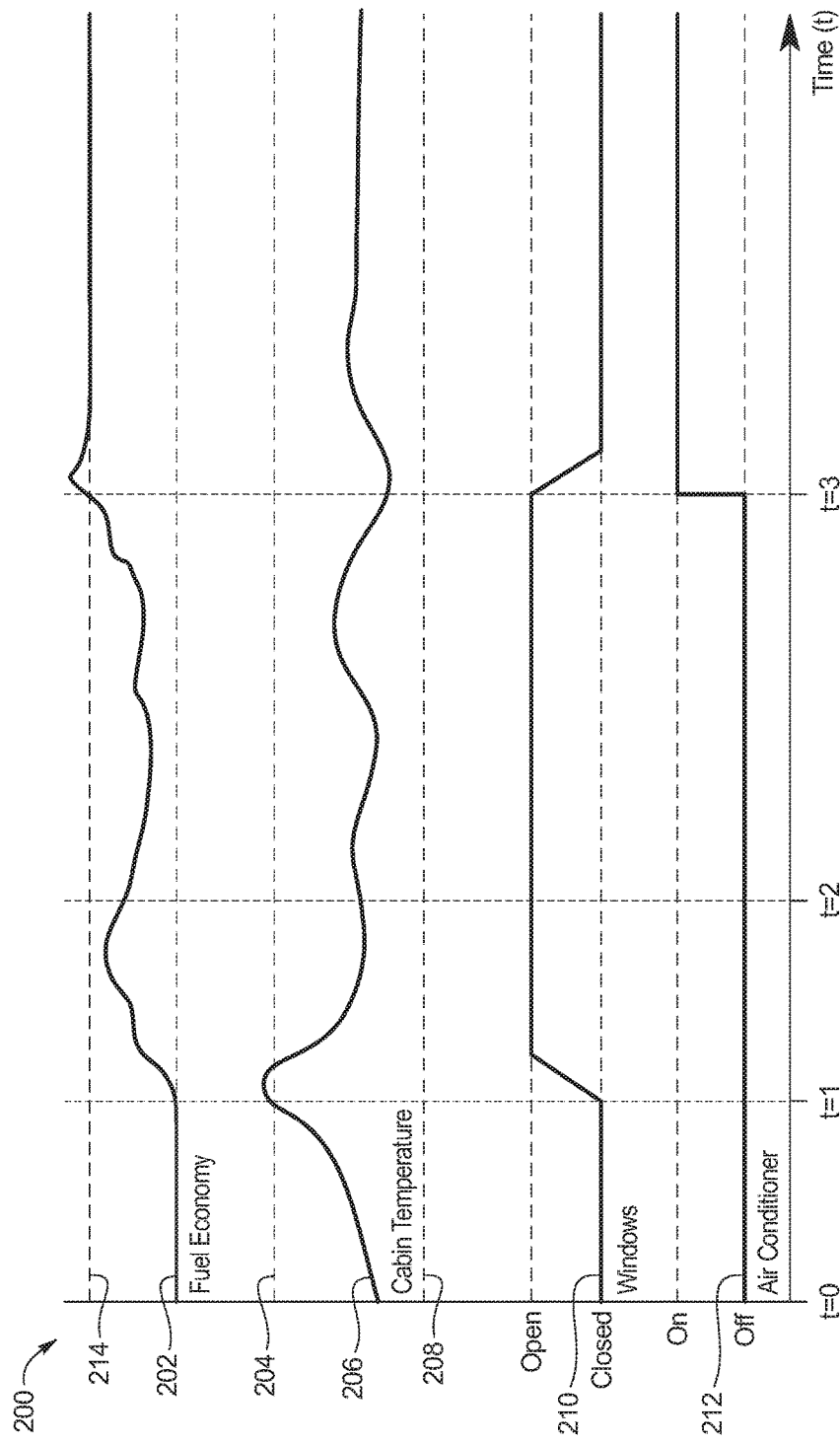
FIG. 2 is a timing diagram illustrating example operation of an adaptive climate control system.
Figure 3:
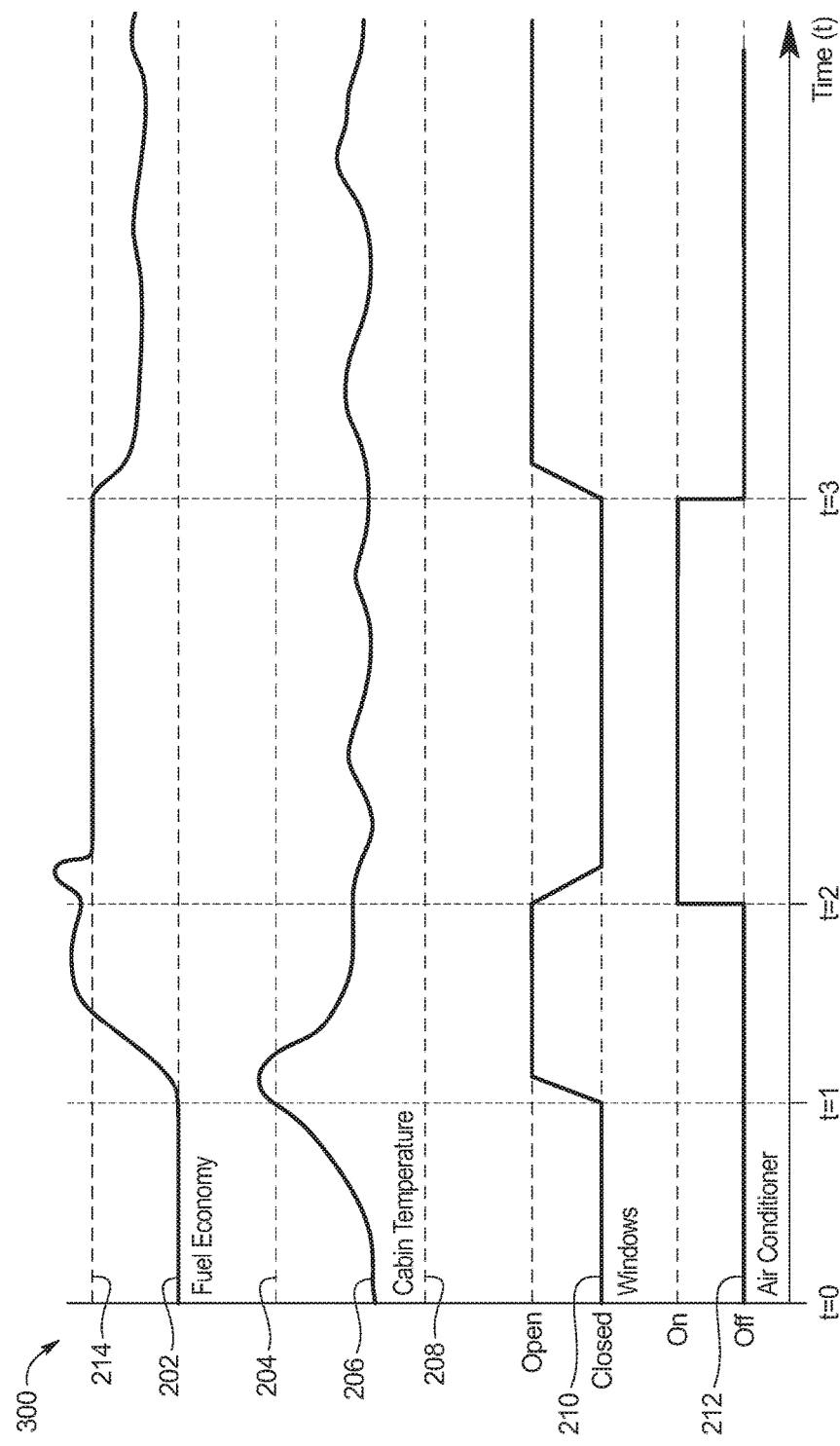
FIG. 3 is a timing diagram illustrating example operation of an adaptive climate control system.

FIGS. 2 and 3 are timing diagrams 200 and 300 illustrating example operation of the adaptive climate control system of the vehicle 100 of FIG. 1. In both diagrams the vehicle's 100 adaptive cooling is in intermediate speed mode. In both timing diagrams 200 and 300, the fuel economy delta of vehicle 100 is represented by the fuel economy line 202, the first temperature threshold is represented by the temperature upper threshold line 204, the cabin temperature is represented by a cabin temperature line 206, the second temperature threshold is represented by a temperature lower threshold line 208, the state (e.g., open, closed, partially open, etc.) of the power windows 120-124 is represented by a window state line 210, the state of the air conditioner 136 is represented by an AC state line 212, and the fuel economy threshold is represented by a fuel economy line 214.

In the timing diagram 200 for FIG. 2, at time t=0, the cabin temperature (as represented by the cabin temperature line 206) does not satisfy the first temperature threshold (as represented by the temperature upper threshold line 204), the power windows 120-124 are closed, and the air conditioner 136 is off. At t=1, the cabin temperature satisfies the first temperature threshold. Accordingly, the climate control adapter 118 opens the power windows 120-124. At t=2, the efficiency monitor 110 calculates the fuel economy delta (as represented by fuel economy line 202). Because the fuel economy delta, as calculated by the efficiency monitor 110, does not satisfy (e.g. is less than) the fuel economy threshold (as represented by the fuel economy line 214), the power windows 120-124 remain open and the air conditioner 136 remains off. At t=3, the fuel economy delta, as calculated by the efficiency monitor 110, satisfies (e.g. is greater than) the fuel economy threshold. Accordingly, the climate control adapter 118 closes the power windows 120-124 and activates the air conditioner 136.

In the timing diagram 300, at time t=0, the cabin temperature (as represented by the cabin temperature line 206) is below the first temperature threshold (as represented by the temperature upper threshold line 204), the power windows 120-124 are closed, and the air conditioner 136 is off. At t=1, the cabin temperature satisfies the first temperature threshold. Accordingly, the climate control adapter 118 opens the power windows 120-124. Between t=1 and t=2, the fuel economy delta, as calculated by the efficiency monitor 110, satisfies the fuel economy threshold (as represented by the fuel economy line 214). At t=2, the efficiency monitor 110 calculates the fuel economy delta. Because the fuel economy delta (as represented by the fuel economy line 202), as calculated by the efficiency monitor 110, satisfies the fuel economy threshold, the climate control adapter 118 closes the power windows 120-124 and activates the air conditioner 136. At t=3, the vehicle 100 is traveling at a speed for which data is available. The available data indicates that the power windows 120-124 should be opened and the air conditioner 136 deactivated. Accordingly, the climate control adapter 118 opens the power windows 120-124 and deactivates the air conditioner 136, and the fuel economy delta, as calculated by the efficiency monitor 110, decreases.

Figure 4:
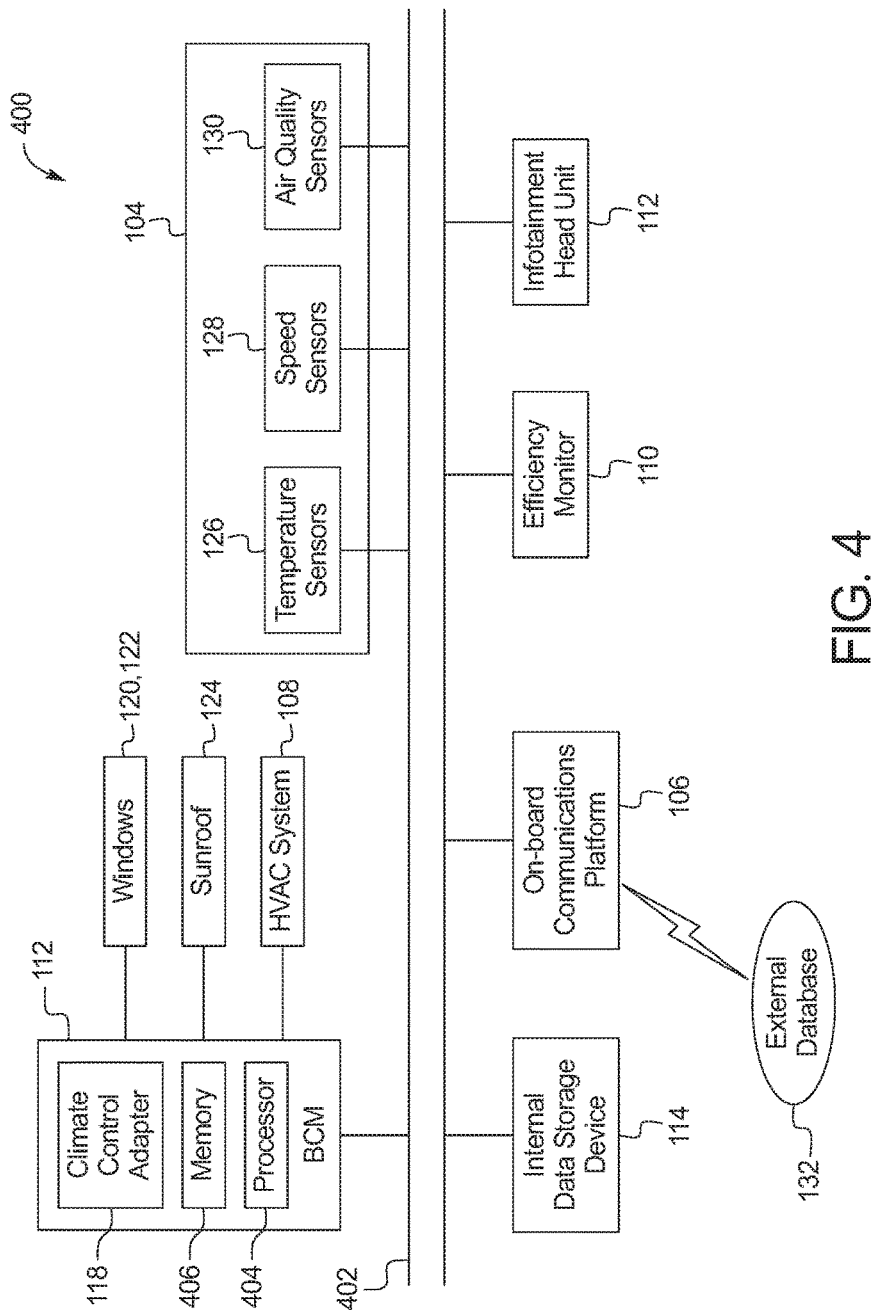
FIG. 4 is a block diagram of electronic components of the vehicle of FIG. 1.

FIG. 4 is a block diagram of electronic components 400 of the vehicle 100 of FIG. 1. The example electronic components include a vehicle data bus 402, sensors 104, the on-board communications platform 106, the efficiency monitor 110, the body control module 116, and the infotainment head unit 112.

The vehicle data bus 402 communicatively couples the sensors 104, on-board communications platform 106, efficiency monitor 110, internal data storage device 114, body control module 116, and the infotainment head unit 112. In some examples, the vehicle data bus 402 includes one or more data buses. The vehicle data bus 402 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

The body control module 116 includes a processor or controller 404 and memory 406. In the illustrated example, the body control module 116 is structured to include the climate control adapter 118. Alternatively, in some examples, the climate control adapter 118 may be incorporated into another electronic control unit (ECU) with its own processor 404 and memory 406. The processor or controller 404 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 406 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 406 includes multiple kinds of memory, particularly volatile memory and non-volatile memory. In the illustrated example, the internal data storage device 114 is a high-capacity storage device (e.g. a hard drive, solid state drive, etc.) In some examples, the internal data storage device 114 is part of the memory 406.

The memory 406 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 406, the computer readable medium, and/or within the processor 404 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 5:
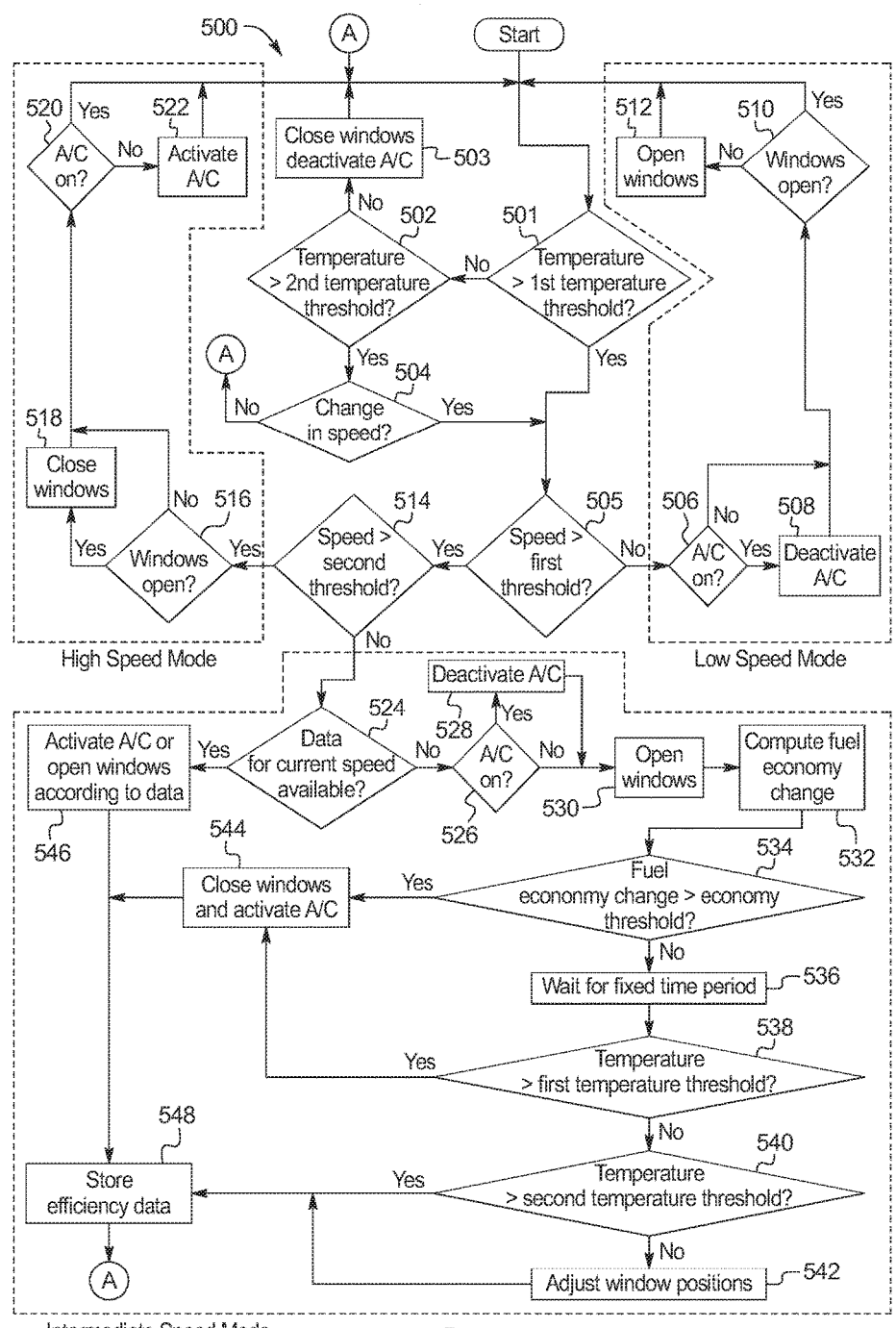
FIG. 5 is a flowchart of a method to implement an example adaptive climate control system.

FIG. 5 is a flowchart of a method 500 to implement the adaptive climate control system. Initially, at block 501, the climate control adapter 118 determines whether to enter one of the adaptive cooling modes. The climate control adapter 118 measures, via the temperature sensors 126, the temperature of the cabin 102 (e.g., as represented by the cabin temperature line 206 of FIGS. 2 and 3 above) and determines whether the temperature of the cabin 102 satisfies the first temperature threshold (e.g., as represented by the temperature upper threshold line 204 of FIGS. 2 and 3 above). If the temperature of the cabin 102 satisfies the first temperature threshold, the method 500 proceeds to block 505. If the temperature of the cabin 102 does not satisfy the first temperature threshold, the method 500 proceeds to block 502. At block 502, the climate control adapter 118 determines whether the temperature of the cabin 102, as measured by the temperature sensors 126, satisfies the second temperature threshold (e.g., as represented by the temperature lower threshold line 208 of FIGS. 2 and 3 above). If the temperature of the cabin 102 satisfies the second temperature threshold, the method 500 proceeds to block 504. If the temperature of the cabin 102 does not satisfy the second temperature threshold, the method 500 proceeds to block 503. At block 503, the climate control adapter 118 closes the power windows 120-124 and/or deactivates the air conditioner 136 and the method 500 returns to block 501. At block 504, the climate control adapter 118 measures the vehicle's 100 speed, via the speed sensor 128, to determine whether there has been a change in the vehicle's 100 speed. In the illustrated example, a change in the vehicle's 100 speed is a non-zero difference between the vehicle's 100 current speed and the vehicle's 100 last measured speed. If there has been a change in the vehicle's 100 speed, the method 500 proceeds to block 505. If there has been no change in the vehicle's 100 speed, the method 500 returns to block 501.

At block 505, the climate control adapter 118 measures the vehicle's 100 speed, via the speed sensor 128, to determine whether to enter the low speed mode. If the vehicle's 100 speed, as measured by the speed sensor 128, satisfies (e.g. is greater than) the first threshold, the method 500 proceeds to block 514. If the vehicle's 100 speed does not satisfy (e.g. is less than) the first threshold, the climate control adapter 118 enters the low speed mode and the method 500 proceeds to block 506.

At block 506, the climate control adapter 118 determines whether the air conditioner 136 is active. If the air conditioner 136 is not active, the method 500 proceeds to block 510. If the air conditioner 136 is active, the method 500 proceeds to block 508. At block 508, the climate control adapter 118 deactivates the air conditioner 136. At block 510, the climate control adapter 118 determines whether the power windows 120-124 are open. If the power windows 120-124 are open, the method 500 returns to block 502. If the power windows 120-124 are not open, the method 500 proceeds to block 512. At block 512, the climate control adapter 118 opens the power windows 120-124 and the method 500 returns to block 501.

At block 514, the climate control adapter 118 measures, via the speed sensor 128, the vehicle's 100 speed to determine whether to enter the high speed mode or the intermediate speed mode. If the vehicle's 100 speed, as measured by the speed sensor 128, does not satisfy the second threshold, the climate control adapter 118 enters the intermediate speed mode and the method 500 proceeds to block 524. If the vehicle's 100 speed satisfies the second threshold, the climate control adapter 118 enters the high speed mode and the method 500 proceeds to block 516.

At block 516, the climate control adapter 118 determines whether the power windows 120-124 are open. If the power windows 120-124 are not open, the method 500 proceeds to block 520. If the power windows 120-124 are open, the method 500 proceeds to block 518. At block 518, the climate control adapter 118 closes the power windows 120-124. At block 520, the climate control adapter 118 determines whether the air conditioner 136 is active. If the air conditioner 136 is active, the method 500 returns to block 501. If the air conditioner 136 is not active, the method 500 proceeds to block 522. At block 522, the climate control adapter 118 activates the air conditioner 136 and the method 500 returns to block 501.

At block 524, the climate control adapter 118 queries the external database 132, via the on-board communications platform 106, to determine whether efficiency data is available for the vehicle's 100 current speed. If efficiency data is available, the method 500 proceeds to block 546. If efficiency data is not available, the process 500 proceeds to block 526.

At block 526, the climate control adapter 118 determines whether the air conditioner 136 is active. If the air conditioner 136 is not active, the method 500 proceeds to block 530. If the air conditioner 136 is active, the method 500 proceeds to block 528. At block 528, the climate control adapter 118 deactivates the air conditioner 136 and the method 500 proceeds to block 530. At block 530, the climate control adapter 118 opens the power windows 120-124.

At block 532, the climate control adapter 118 computes a fuel economy delta, via the efficiency monitor 110.

At block 534, the climate control adapter 118 determines whether to leave the power windows 120-124 open or to use the air conditioner 136. If the fuel economy delta satisfies (e.g. is greater than) the fuel economy threshold, the method 500 proceeds to block 544. If the fuel economy delta does not satisfy (e.g. is less than) the fuel economy threshold, the method 500 proceeds to block 536.

At block 536 the climate control adapter 118 waits for a time period for the open windows 120-124 to cool the cabin 102. For example, the time period may be one minute.

At block 538, the climate control adapter 118 measures the temperature of the cabin 102, via the temperature sensors 126, and determines whether to use the air conditioner 136 despite open windows 120-124 providing better fuel economy. In the illustrated example, the climate control adapter 118 uses the air conditioner 136 if the open windows 120-124 failed to provide cooling sufficient to such the temperature of the cabin 102 does not satisfy first temperature threshold. If the temperature of the cabin 102 satisfies the first temperature threshold, the method 500 proceeds to block 544. If the temperature of the cabin 102 does not satisfy the first temperature threshold, the method proceeds to block 540.

At block 540, the climate control adapter 118 measures the temperature of the cabin 102, via the temperature sensors 126, and determines whether to adjust the power windows 120-124 positions. In the illustrated example, the climate control adapter 118 adjusts the power windows 120-124 positions if the temperature of the cabin 102 does not satisfy the second temperature threshold. If the temperature of the cabin 102 satisfies the second temperature threshold, the method 500 proceeds to block 548. If the temperature of the cabin 102 does not satisfy the second temperature threshold, the method 500 proceeds to block 542.

At block 542, the climate control adapter 118 adjusts the power windows 120-124 positions and the method 500 proceeds to block 548.

At block 544, the climate control adapter 118 closes the power windows 120-124, activates the air conditioner 136, and the method 500 proceeds to block 548.

At block 546, the climate control adapter 118 takes an action based on the efficiency data retrieved at block 524. In the illustrated example, the climate control adapter 118 activates the air conditioner 136 or opens the power windows 120-124. After the climate control adapter 118 has taken the action, the method 500 proceeds to block 548.

At block 548, the climate control adapter 118 stores the efficiency data. In the illustrated example, the efficiency data is stored to the internal data storage device 114. In the illustrated example, the efficiency data includes the vehicle's 100 speed, the state of the power windows 120-124 (e.g., as represented by the window state line 210 of FIGS. 2 and 3 above), and the state of the air conditioner 136 (e.g., as represented by the AC state line 212 of FIGS. 2 and 3 above). In some examples, in addition to storing the efficiency data, the climate control adapter 118 uploads the efficiency data to the external database 132, via the on-board communications platform 106. After the climate control adapter 118 stores the efficiency data, the method 500 returns to block 502.

The flowchart of FIG. 5 is representative of machine readable instructions stored in memory (such as the memory 406 of FIG. 4) that comprise one or more programs that, when executed by a processor (such as the processor 404 of FIG. 4), cause the vehicle 100 to implement the climate control adapter 118 of FIGS. 1 and 4. Further, although the example program(s) is/are described with reference to the flowchart illustrated in FIG. 5, many other methods of implementing the example climate control adapter 118 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   sensors;
   windows;
   processors configured to: perform adaptive cooling based on a speed of the vehicle, a fuel economy value and an internal temperature, wherein the adaptive cooling includes adjusting at least one position of a designated amount of the windows in response to the internal temperature of the vehicle not satisfying temperature thresholds, the designated amount being less than all of the windows.

2. The vehicle of claim 1, wherein adaptive cooling includes entering one of a plurality of modes, wherein the plurality of modes include a low speed mode, a high speed mode, and an intermediate speed mode.

3. The vehicle of claim 2, wherein the processors are further configured to:
   responsive to entering the low speed mode:
   deactivate an air conditioner of the vehicle; and
   open the windows.

4. The vehicle of claim 2, wherein the processors are further configured to: responsive to entering the high speed mode:
   close the windows; and
   activate an air conditioner of the vehicle.

5. The vehicle of claim 2, wherein the processors are further configured to:
   responsive to entering the intermediate mode:
   measure the speed of the vehicle;
   receive data associated with the speed of the vehicle; and
   based on the speed of the vehicle and the data:
   open the windows of the vehicle, or
   activate an air conditioner of the vehicle.

6. The vehicle of claim 5, wherein to receive the data associated with the speed of the vehicle, the processors are to receive the data from an external database, wherein the data includes a vehicle model, the speed, and an action specifying a first state of the windows and a second state of the air conditioner.

7. The vehicle of claim 5, wherein to receive the data associated with the speed of the vehicle, the processors are to retrieve the data from an internal data storage device.

8. The vehicle of claim 2, wherein after entering the intermediate speed mode, the processors to:
measure the speed of the vehicle;
open the windows of the vehicle;
measure a change in fuel economy of the vehicle; and
close the windows and activate an air conditioner of the vehicle in response to the change in fuel economy satisfying a fuel economy threshold.

9. The vehicle of claim 8, wherein the threshold temperatures include a first temperature threshold and a second temperature threshold, and wherein the processors are further configured to:
measure the internal temperature of the vehicle;
close the windows and activate the air conditioner in response to the internal temperature satisfying the first temperature threshold; and
adjust positions of the windows in response to the internal temperature not satisfying the first temperature threshold and the internal temperature not satisfying the second temperature threshold.

10. The vehicle of claim 9, wherein the processors are further configured to adjust the positions of the windows by opening front ones of the windows and closing rear ones of the windows.

11. The vehicle of claim 9, wherein to the processors are further configured to adjust the positions of the windows by:
opening a sun roof;
opening rear ones of the windows; and
closing front ones of the windows.

12. The vehicle of claim 9, wherein the processors are further configured to adjust the positions of the windows by partially closing the windows.

13. A method comprising:
opening windows of a vehicle;
calculating, with a processor, a change in fuel economy of the vehicle;
closing the window and activating an air conditioner of the vehicle, via an HVAC controller, in response to the change in fuel economy satisfying a fuel economy threshold; and
adjusting a designated amount of the windows in response to the change in fuel economy not satisfying the fuel economy threshold, the designated amount being less than all of the windows.

14. The method of claim 13 further including, in response to the change in fuel economy not satisfying the fuel economy threshold:
measuring an internal temperature of the vehicle;
closing the window and activating the air conditioner, in response to the internal temperature of the vehicle satisfying a first temperature threshold; and
adjusting a position of the window in response to the internal temperature of the vehicle not satisfying the first temperature threshold and the internal temperature of the vehicle does not satisfy a second temperature threshold.

15. The method of claim 14 further including recording data to an internal data storage device of the vehicle, the data including a speed of the vehicle and a first state of the window and a second state of the air conditioner.

16. The method of claim 13 further including uploading data to an external database, the data including a vehicle model, a speed of the vehicle, a first state of the air conditioner, and a second state of the window.

17. A method comprising:
measuring a speed of a vehicle;
receiving, from at least one of a group consisting an internal data storage device of the vehicle and an external database, speed data based on a model of the vehicle, the speed data correlating different speeds of the vehicle with first states of vehicle windows and second states of a vehicle air conditioner;
based on the speed data, performing, with a processor, one of opening the vehicle windows or controlling the vehicle air conditioner; and
performing, with the processor, adaptive cooling based on the speed of the vehicle, a fuel economy value of the vehicle, and an internal temperature of the vehicle, wherein the adaptive cooling includes adjusting at least one position of a designated amount of the vehicle windows in response to the internal temperature of the vehicle not satisfying temperature thresholds, the designated amount being less than all of the vehicle windows.

18. The method of claim 17 further including storing the speed data to the internal data storage device of the vehicle.

* * * * *